Patented Aug. 19, 1952

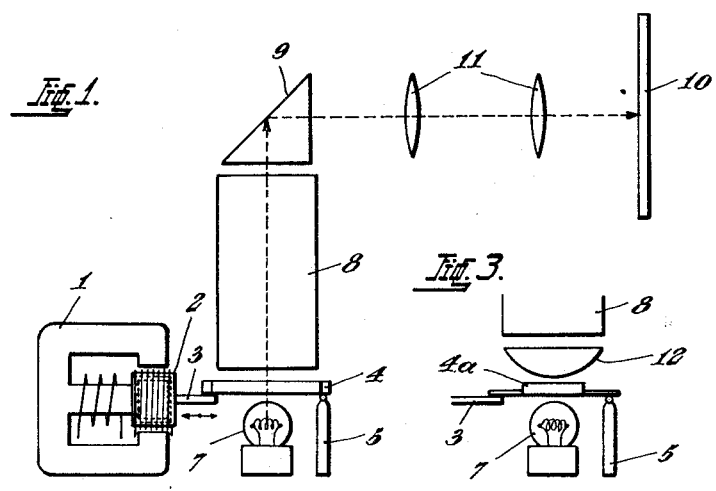
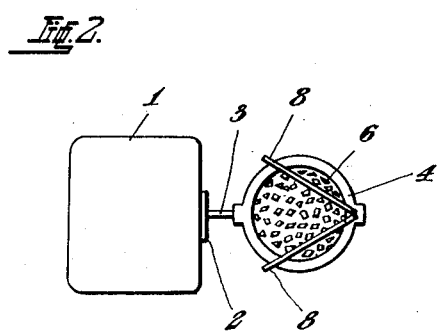

2,607,269

UNITED STATES PATENT OFFICE 2,607,269

PROJECTING KALEIDOSCOPE WITH RAPIDLY OSCILLATED ELEMENTS AND PARTICLES

Johann Friedrich Elsaesser, Kirchberg, Switzerland

Application December 31, 1947, Serial No. 795,030
In Switzerland March 13, 1945

Section 1, Public Law 690, August 8, 1946
Patent expires March 13, 1965

4 Claims. (Cl. 88—24)

This invention relates to improved kaleidoscope structures the characteristic feature of which is that the element or particles required for the production of the kaleidoscopic picture are accommodated in at least one container which is connected with an oscillatory system excited by electric currents of acoustic frequency so that the container is also caused to oscillate when the system is excited.

In the kaleidoscope according to the invention the changes in the kaleidoscopic picture are dependent on acoustic oscillations.

The accompanying drawing illustrates, by way of example and diagrammatically, one form of construction according to the invention.

Figure 1 is a side view and Figure 2 a plan view of the kaleidoscope.

Figure 3 shows a modification of the form of construction illustrated in Figure 1.

The cylindrical electro-magnet 1 of an electro-dynamic oscillatory system is provided in a known manner with an oscillating coil 2 which is movable in the air gap of the magnet in the direction of the axis of the magnet. The rod 3 connects the oscillating coil 2 with a circular box or transparent container 4 which is mounted on the pointed end of a resilient support 5 in such a manner as to be displaceable horizontally. The flat lower surface of the box 4 consists of a frosted glass disc and the flat upper surface of a clear glass plate. The box contains transparent particles 6 of different colors and shapes such as glass splinters which rest loosely next to one another on the frosted glass disc. Under the box 4 there is provided a source of light 7. Over the box there are arranged two mirrors 8 abutting against each other along a longitudinal edge and inclined relatively to one another under an angle of 60° in such a manner that the abutting edge lies perpendicular to the plane of the box. An optical prism 9 is provided over the mirrors 8 by means of which prism the rays, which come from the source of light 7 and pass through the box 4 with the elements 6 reflected by the mirrors 8 arranged at an angle, are deflected on to a projection screen 10. A system of lenses 11 is arranged between the prism 9 and the screen 10, which system serves for the projection of the kaleidoscopic picture on to the screen 10.

When the oscillating coil 2 is energized by electric currents of acoustic frequencies the coil 2 is set into vibrations in the direction of the axis of the magnet which are transmitted according to the arrows (Fig. 1) by the rod or carrier 3 to the box 4 containing the elements 6. By the action of the lateral shocks the elements thus are constantly mutually displaced thereby changing the kaleidoscopic picture, which by means of the source of light 7, angularly arranged mirrors 8, prism 9 and system of lenses 11 is projected on to the screen 10.

The oscillating coil 2 of the kaleidoscope may be connected to a radio apparatus or a phonograph in the place of an electro-dynamic loud speaker or be preferably connected to such a loud speaker. The kaleidoscopic picture produced by the elements 6 of different shapes and colors has geometrical forms, which in the last mentioned case is subjected, simultaneously with the production of sound by the loud speaker, to a change dependent upon the volume, rhythm and frequencies of the sound. In order to change the character of the kaleidoscopic pictures the elements 6 may be replaced by elements of other shapes and colors.

For this purpose the box 4 may be removably attached to the carrier or rod 3. The box may also be mounted on balls instead of one or more pointed ends. In order to reduce the weight and the inertia of the box and of the elements contained therein, according to a modification illustrated in Figure 3 the box 4a, which is placed on a holder extending between said carrier and said support, and the elements contained in said box, may be made of substantially smaller dimensions than the box 4. By means of a magnifying glass 12 arranged over the box 4a the elements 6 are suitably enlarged. Instead of using one box 4a several boxes may be mounted next to or over one another and be connected to the oscillatory system. By dispensing with the prism the system of lenses and the projection screen may be provided directly over the mirrors in which case the screen then consists of frosted glass so that the projected picture pattern is visible on the upper surface of the glass screen.

Having thus described the invention, what is claimed as new and desired to be secured by Letters Patent, is:

1. The combination, in a kaleidoscopic projection system, of an electrically excitable vibratile member responsive to voice currents, said member being adapted to execute linear vibratory movements in a predetermined plane in response to said currents, with a light-transmitting container having transparent particles of different colors and shapes therein and arranged for movement substantially within said plane, said container forming a continuation of said vibratile member and being directly connected to said vibratile member, thereby fully participating in said linear vibratory movements thereof and transmitting at least part of said linear vibratory movements to said particles, a source of light for illuminating said particles in said container, and kaleidoscope projection means including lens means and screen means in operative alignment with said container for projecting images of said particles upon said screen.

2. The combination, in a kaleidoscopic projection system, of an electrically excitable vibratile member responsive to voice currents, said member being adapted to execute linear vibratory movements in a predetermined plane in response to said currents, with a light-transmitting container having transparent particles of different colors and shapes therein and arranged for movement substantially within said plane, said container forming a continuation of said vibratile member and being rigidly connected to said vibratile member, thereby fully participating in said linear vibratory movements thereof and transmitting at least part of said linear vibratory movements to said particles, a source of light for illuminating said particles in said container, and optical means including a system of mirrors and lens means in operative alignment with said container for producing a kaleidoscopic image of said particles.

3. The combination according to claim 2, wherein said container is arranged for movement in a horizontal plane, one portion of said container being directly connected to said vibratile member, another portion of said container resting on a stationary support.

4. The combination according to claim 3, wherein said stationary support includes at least one ball bearing engaging said container and minimizing the inertia resistance of said container to said linear vibratory movement.

JOHANN FRIEDRICH ELSAESSER.

REFERENCES CITED

The following references are of record in the file of this patent:

UNITED STATES PATENTS

| Number | Name | Date |
| --- | --- | --- |
| 1,454,691 | Riddell et al. | May 8, 1923 |
| 2,297,767 | Hunt | Oct. 6, 1942 |
| 2,411,804 | Plebanek | Nov. 26, 1946 |

FOREIGN PATENTS

| Number | Country | Date |
| --- | --- | --- |
| 235,994 | Great Britain | July 2, 1925 |
| 277,569 | Italy | Sept. 12, 1930 |